Figure 3:
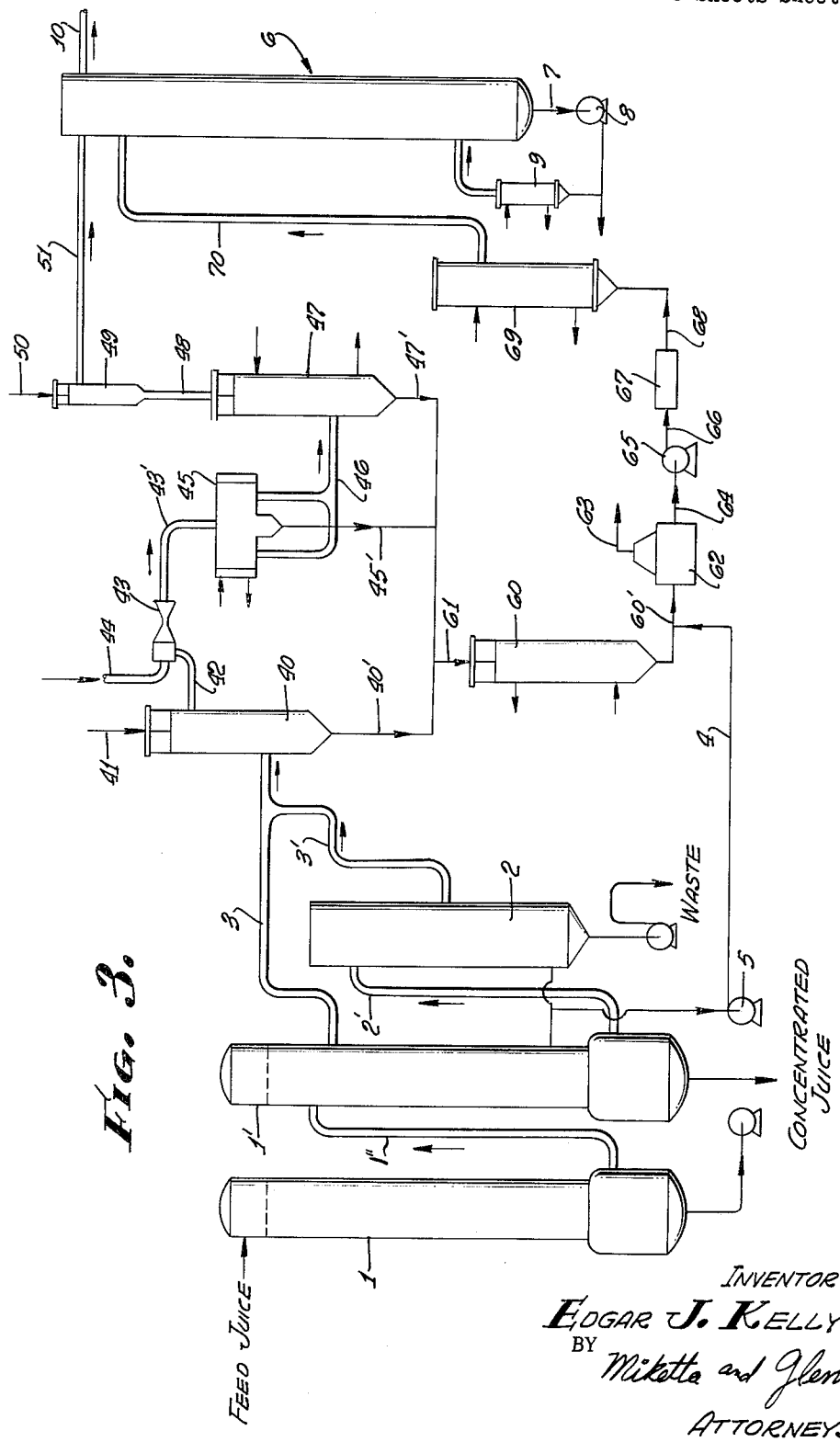

Dec. 14, 1965  E. J. KELLY  3,223,534
METHOD OF IMPROVING FLAVOR CONSTITUENTS
Filed Nov. 7, 1962  3 Sheets-Sheet 1
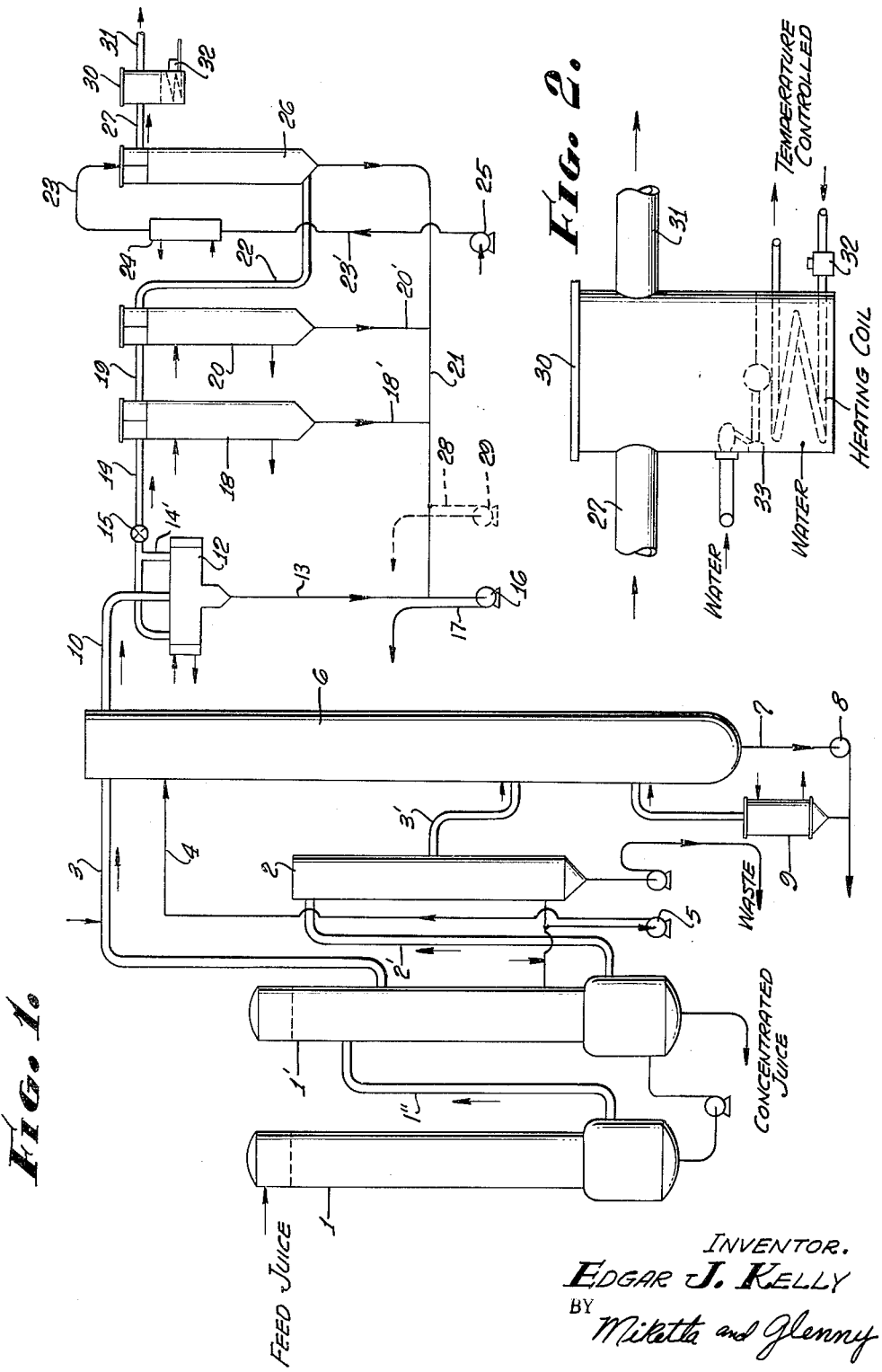
INVENTOR.
EDGAR J. KELLY
BY
Miketta and Glenny
ATTORNEYS.

Dec. 14, 1965  E. J. KELLY  3,223,534
METHOD OF IMPROVING FLAVOR CONSTITUENTS
Filed Nov. 7, 1962  3 Sheets-Sheet 2

INVENTOR.
EDGAR J. KELLY
BY
Miketta and Glenny
ATTORNEYS.

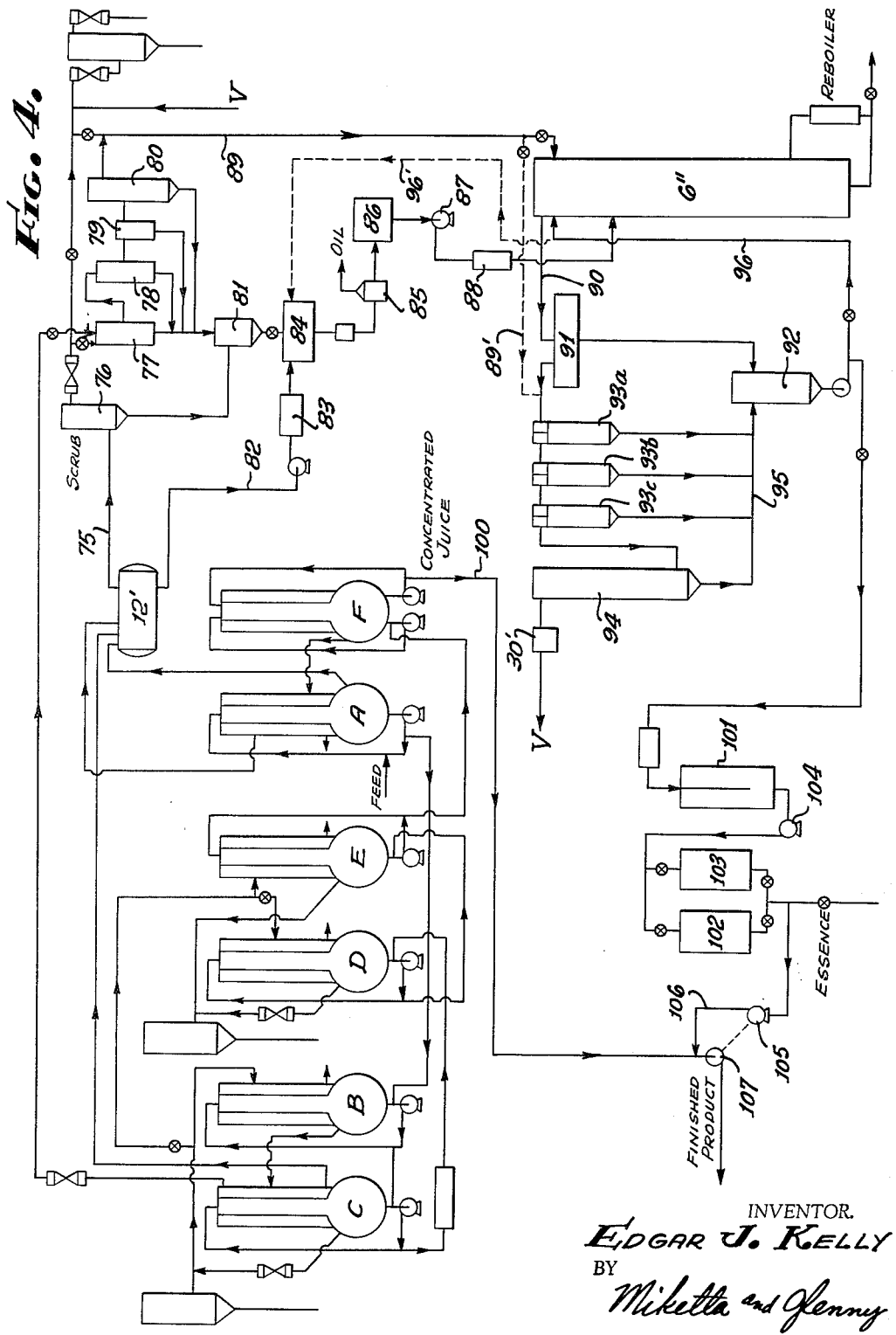

United States Patent Office 3,223,534
Patented Dec. 14, 1965

3,223,534
METHOD OF IMPROVING FLAVOR CONSTITUENTS
Edgar J. Kelly, Lake Zurich, Ill., assignor to Libby, McNeill & Libby, Chicago, Ill., a corporation of Maine
Filed Nov. 7, 1962, Ser. No. 236,097
13 Claims. (Cl. 99—140)

This application is a continuation-in-part of application Serial No. 766,902, filed October 13, 1958, now U.S. Patent No. 2,992,978 and Serial No. 73,742, filed December 5, 1960.

The present invention is directed to a method of separating the characteristic odor and flavor constituents from aqueous source materials generally derived from fruit, berries, beverage materials, such as tea and coffee, etc. The invention is also directed to specific conditions and arrangements of elements for the production of a new concentrate or distillate containing the flavor and aroma constituents in very large proportion or high concentration. The present invention is also directed to both a method and apparatus for removing traces of oily constituents which contaminate and impair the flavor and aroma constituents. This application is a continuation-in-part of application Serial No. 73,742, filed December 5, 1960, which is a continuation-in-part of application Serial No. 766,902, filed October 13, 1958, now United States Patent No. 2,992,978.

For many years it has been recognized that fresh fruit and vegetable juice contained flavoring and aromatic constituents which are extremely characteristic of the particular fruit, plant extract or the like. It has also been recognized that the natural, fresh flavor and aroma of fruit, berries, tea, coffee and other foods are deleteriously affected by the normal concentrating, heating and sterilizing steps, with cooked and off flavors and with a loss of the aroma and flavor which characterizes fresh, mature fruit. Some attempts have been made in the past to recover the relatively volatile flavors and components found in plant products for the purpose of reintroducing them into the final concentrate or canned, cooked or sterilized fruit in order to impart thereto the flavor and aroma of the fresh, natural fruit.

Prior attempts to obtain a fraction in which it was hoped that the flavoring and aromatic constituents would be present in concentrated quantity were not successful and were fallacious in their method of operation. Prior workers in this art appeared to be confused and looked for an oily material as a source of the flavor. The present invention obtains the flavoring and aromatic constituents in a non-oily, water-soluble and miscible form which is virtually colorless, transparent, mobile, burns with a clear blue flame and has a remarkably low freezing point, well below —100° C. and as low as —180° C.

Contrary to the teaching of the prior art, it has been found that the oily contaminants (present with the flavor and aromatic constituents in citrus products) impart unpleasant taste and odor characteristics even when present in extremely small proportions. Also, it has been found that the oily contaminants should be removed prior to concentration of the flavor and odor constituents in order to facilitate separation and obtain a stable product.

One of the reasons for the failures of the prior art was the fact that the prior workers did not realize the importance of maintaining conditions of temperature and pressure below 65° C. and 190 mm. of Hg (preferably below 55 or 43° C. and 155–120 mm. Hg) when dealing with fruit juices, citrus juices and other flavorful source materials. It has been found that the conditions of operation should be such as to prevent or minimize hydrolysis of the esters and ethers of acetic acid into acids, alcohols and secondary reaction products. It has also been discovered that the esters and ethers of acetic acid appear to constitute important components which impart the characteristic fresh, natural flavor and aroma elements to the concentrate and to the products in which it is subsequently used; a colorimetric determination involving the ethyl ester of acetic acid (ethyl acetate) content of a concentrate provides a ready mode of evaluation.

Although some prior patentees have referred to what they termed a "100 fold essence" which they allegedly obtained, such term had no true meaning other than the volume of the condensate taken out of the system was $\frac{1}{100}$ of the juice fed into the system. For example, Patent No. 2,457,315 speaks of pumping 50 g.p.h. of apple juice into a single stage evaporator, evaporating 10% of such juice, passing the vapors into a fractionating column and condensing the vapors from such column, all at atmospheric pressure. Uncondensed gases were vented from the condenser and the condensate was drawn off at $\frac{1}{100}$ of the rate at which fresh juice was fed into the evaporator, this condensate being termed a "100 fold essence." It is evident that in such process the condenser would be fed with vapors composed essentially of water and therefore the condensate would also consist essentially of water since the water will be condensed first. The mole fraction or concentration of the flavor constituents in vapors sent to such prior condenser is far below 0.5% and the vapors would exhibit all of the properties of water vapor. The partial pressure of the volatile constituents at no time approach saturation presures. At no time would the prior patentees eliminate the water and then condense the more volatile constituents under conditions which effectively utilized partial pressure phenomena and Dalton's law. Dew point conditions (with respect to the flavoring and aromatic constituents) were never reached; the mixtures of air, gases and vapors sent to the condenser contained excessive amounts of water vapor. As a result, the so-called "100 fold essence" was simply a mathematical and volumetric determination and dod not actually contain any appreciably increased quantity of flavoring components.

The fallacy of the prior method of identifying the "essence" becomes apparent when one considers that orange juice appears to contain a maximum of only about 30 p.p.m. of true essence, so that only about ⅕ to 1.6 lbs. of water-free essence can be obtained from 52,000 lbs. of citrus juice. The products made by the method of this invention actually contain from 200 to as high as one thousand times as much flavoring constituents as the original source material or juice, even in the unpurified, aqueous solution form in which they are normally obtained. Moreover, it is to be remembered that ethyl acetate has a vapor pressure of 760 mm. absolute at about 77° C., whereas water at the same temperature has a vapor pressure of 7 lbs. gauge.

Contrary to prior suggestions that the concentrated or flavor-stripped juice be used as an absorbent or scrubber for the non-condensed gases or vapors prior to venting such residual gases (in an attempt to recover some of the flavoring components from said gases), it has been found that such flavor-stripped juices are not good absorbents; instead, pure water (or dilute, aqueous solutions of ethyl alcohols or sucrose) have been found much more effective. Also, contrary to prior practice which was concerned solely wtih removing water in order to obtain a small volume of liquid to be fractionally distilled, the present invention after initially obtaining a small volume of liquid actually adds water to separate the oily contaminants prior to fractional distillation since simple condensation does not separate the oily contaminants from the flavor constituents.

Generally stated, therefore, the present invention departs from the prior art and relates to a method of obtaining flavoring constituents from aqueous source materials (such as juices of fresh, natural, desiduous and citrus fruits, berries, aqueous extracts of tea leaves, roasted and ground coffee, etc.) by conducting all of the operations under temperature and pressure conditions which will not cause hydrolysis of esters of acetic acid, the temperatures not exceeding 65° C. and preferably being below 55°–43° C. and absolute pressures not over 190 mm. of Hg and preferably as low as 50–30 mm. Hg. Any such source material in the form of water vapor and non-condensable gases containing minute quantities of volatile odor and flavor constituents is subjected to a temperature below about 43° C. and an absolute pressure of not over 120 mm. Hg in a condensation zone to condense not less than 65% or 70%, and preferably 80% by weight of water contained in said source material. After the water has been separated from the residual vapors and gases, such vapors and gases are subjected to dew point conditions for flavor and odor constituents and are readily condensed in accordance with Dalton's law. These flavor and odor constituents are obtained in the form of aqueous solutions having the characteristics described hereinbefore and may contain in excess of 40 grams per liter of such constituents. Depending upon the source material, the final product may contain from 200 to 30,000 or 60,000 p.p.m. of the volatile flavor-and-aroma-imparting constituents, this being a readily handled and utilized product which is not as unstable as the pure essence; more concentrated forms have to be handled at very low temperatures because of their volatile character.

When the source material in the form of a gaseous mixture of water vapor and odor and flavor constituents contains traces of oily contaminants, it is preferably repeatedly scrubbed with chilled water and passed through jet condensers. The oily contaminants are then removed from the scrub water and condensates. The water and scrubbed gaseous mixture are then fractionally distilled to produce the gaseous mixture from which the flavor and odor constituents may be fractionally condensed.

It is an object of the present invention, therefore, to disclose and provide means, methods and conditions whereby concentrated distillates or products containing flavor-and-aroma-imparting constituents may be derived from various aqueous media.

A further object of the present invention is to provide means, methods and conditions whereby virtually oil-free flavor and odor constituents may be separated from a gaseous mixture contaminated with oily constituents.

Another object is to disclose means and methods of obtaining a high yield of stable flavor-odor essence of controlled and uniform concentration, and in incorporating such essence in predetermined and automatic manner in a finished product.

Those skilled in the art will readily appreciate various other objects and advantages derived from the use of the modes of operation and conditions hereinafter disclosed in greater detail in connection with the description of an exemplary arrangement of apparatus in which the process may be carried out in the treatment of citrus juices. The appended diagrammatic representation of an arrangement of equipment, FIGS. 1 and 2, is directed to the recovery of an essence composed largely of odor and flavor constituents of the character described hereinbefore. FIGS. 3 and 4 are diagrammatic representations of arrangements of equipment for the recovery of flavor and odor constituents from source materials contaminated with oily constituents.

In the exemplary form of apparatus shown in the appended diagram FIG. 1, fresh citrus juice may be introduced into the first of a pair of multiple effect evaporators 1 and 1' and a concentrated juice (from which 15% to about 20% of original water has been removed) is discharged from the second evaporator. Water vapors from the second evaporator may be sent by line 2' to condenser 2 and its condensate is normally sent to waste. Non-condensable gases from 1 are sent to 1' by line 1; non-condensable gases from 1' and condenser 2 are sent by lines 3 and 3' to a fractionating column 6. Since the condensate from 1' contains some flavor and aroma constituent (this may also be true to a lesser degree as to condensate from 2), the condensate is pumped as by pump 5 and fed by line 4 to column 6. Those skilled in the art will understand that suitable supply of heat, valves, temperature and pressure indicating devices etc. are used and need not be shown in the diagram.

It is highly desirable that the evaporators be operated at as low temperature as possible, preferably below 65° C., although somewhat higher temperatures may be employed. It is to be understood that the arrangement of evaporators or other equipment from which the non-condensable gases and extracts or solutions are obtained are not an essential part of this invention; these preliminary units and operations will vary in accordance with the source material being treated; if, for example, a coffee essence is to be obtained, no evaporators would be used, but instead, leaching tanks would be employed for the purpose of obtaining an aqueous extract of coffee, such extract being made at a low temperature of below about 65° C. and preferably at a temperature of below about 43° C.

The equipment illustrated in the diagram FIG. 1 and adapted to carry out the process herein disclosed comprises, in addition to the fractionating column 6, a primary overhead type of condenser indicated at 12, a series of saturation component condensers indicated at 18 and 20, a scrubber indicated at 26 and a constant pressure chamber indicated at 30. It is to be understood that additional saturation component condensers may be employed, the diagram being limited to the two, 18 and 20, only for purposes of implication. The entire system from the fractionating column 6 to the constant pressure chamber 30 is maintained under a substantially uniform vacuum. Uniform and constant vacuum conditions below about 115 mm. Hg are preferably maintained throughout the system; it has been found desirable to maintain pressures as low as 30 mm. Hg in the saturation component condensers 18 and 20 and the scrubber 26. The desired vacuum conditions are attained by connecting the outlet line 31 extending from the constant pressure chamber 30 to a suitable source of vacuum, such as a barometric condenser, suitable pumps, ejectors or the like.

The fractionating column 6 is maintained with a bottom temperature of not over about 55° C., although temperatures as high as 65° C. may be used in some instances. Temperatures at the top of the fractionating column should not exceed 43° C. and are preferably maintained on the order of about 32° C–33° C. A part of the bottoms discharged from the bottom of the fractionating column 6 as by line 7 and sent to the pump 8 may be recirculated through a reboiler 9 and returned to the fractionating column, as indicated. These bottoms may be discharged by the pump 8 to waste or other disposal.

The vapors from the fractionating column 6 are discharged by line 10 to the condenser 12. The temperature and pressure conditions within the condenser 12 are such as to condense not less than about 70% by weight of water contained in the vapors submitted to such condenser through the line 10. As previously indicated, the virtually constant subatmospheric pressure is maintained throughout the system and such pressure should be below about 155 mm. Hg. In actual practice, pressures of approximately 50 mm. Hg to as low as 30 mm. Hg are employed; under such pressure conditions the temperature within the condenser 12 is maintained at between about 30° C. and 43° C. in order to thoroughly strip the gases of at least 70% of their moisture content.

The condensed water is discharged from the overhead condenser 12 as by line 13 and the uncondensable components, residual vapors and gases, are discharged as by lines 14 and 14' into the first of a series of saturation component condensers such as the condenser 18. A valve 15 is indicated in the line 14 and although normally kept open, may be used to slightly throttle the gases and assure condensation of the required amount of water in the condenser 12.

The condenser 18 may be operated at a temperature of, say around 16° C.–18° C., and gases which have not been condensed in the condenser 18 are discharged by line 19 into the condenser 20, which in the example being given, would now operate at a still lower temperature, say, a temperature of approximately 10° C. Lower temperatures may be used in 18 and 20, say 12° C. and 0° C. The odor and flavor constitutents which have been condensed in condensers 18 and 20 are discharged therefrom by lines 18' and 20' respectively, into a manifold line 21, permitting these odor and flavor constituents to be combined. The uncondensed vapors and gases from condenser 20 are then shown being sent by line 22 to the scrubber 26. This scrubber also operates at the very low pressure of 30 mm. to 50 mm. Hg and spray of scrubbing liquid supplied thereto by line 23 is preferably chilled as by a chiller 24 before introduced into the scrubber. As previously indicated, it is desirable to use clean, pure water as a scrubbing liquid and such water may be supplied to the chiller 24 by means of pump 25 and line 23'. The liquid from the scrubber 26, containing its absorbed and adsorbed odor and flavor constituents, is discharged into the line 21. The still uncondensed and uncondensable vapors or gases from the scrubber are now discharged as by line 27 into the constant pressure cahmber 39. FIG. 2 represents an enlargement of constant pressure chamber 30 and shows more details of its construction. This device insures constancy of vacuum throughout the system and contains a body of water in its lower portion, together with a temperature control device indicated at 32 which actuates a valve (or switch) so as to admit either steam or electric current into a heating coil located in such body of water in the event the temperature of the body of water drops below a predetermined point. A float control is also provided (indicated at 33) for the purpose of maintaining a constant level of water in the device. As previously indicated, the outlet pipe 31 leading from the constant pressure chamber is associated with a suitable source of vacuum.

The condensate discharged from condensers 18 and 20 and the scrubber 26 will contain the greatest concentration of the odor and flavor constituents. The condensate from the primary condenser 12 will also contain some odor and flavor constituents but at a low concentration. Although the condensates and concentrates from the condensers 18 and 20 and scrubber 26 may be combinued in a line 21 and separately withdrawn as indicated by line 28 through a pump 29 and sent to essence tanks, bottling, or the like, it has been found desirable to combine these concentrates with the condensate from the primary condenser 12 because of the relatively large amount of the condensate obtained from condenser 12 in comparison with the relatively small quantities (having high concentration of odor and flavor components) obtained from the condensers 18, 20, etc. FIG. 1, therefore, shows line 21 in communication with outlet line 13, all of the concentrates being sent through a pump 16 and then by line 17 to storage.

In the specific embodiment of apparatus shown in FIG. 3, the arrangement of evaporators is the same as that used in FIG. 1. However, the non-condensable gases from evaporator 1' and condenser 2 are sent by lines 3 and 3' to a preparation plant including a scrubber 40 rather than directly to fractionating column 6. Scrubber 40 is supplied with chilled water. Likewise, the condensate from evaporator 1' and condenser 2 is pumped by pump 5 and line 4 to a centrifuge 62 rather than directly to fractionating column 6. The gaseous mixture entering scrubber 40 may contain 0.01% to as high as 0.1% oily contaminants and 60% water vapor. Since the operating pressure of scrubber 40 is preferably maintained at about 10 mm. Hg, Dalton's law indicates that the partial pressure of the oily contaminants is usually about 0.001 mm. Hg assuming a concentration of 0.01%. At such extremely low partial pressures, it can be seen that extremely low temperatures would have to be attained in order to simply condense the oily contaminants. This point is emphasized by the fact that the oily contaminants appear to be somewhat more volatile than water and thus more difficult to condense. Hence scrubber 40 while it does remove a small part of the oily contaminants, serves primarily to increase their concentration by removing other components of the gaseous mixture. By charging chilled water at about 35° F. at 41 and removing it at 40', a large portion of the water vapor and other gaseous components are removed so that the gaseous mixture leaving scrubber 40 through conduit 42 may contain about 1% oily contaminants and 10% water vapor.

The gaseous mixture is pumped through scrubber 40 and conduit 42 by means of a steam jet pump 43 which is fed by steam line 44. The steam jet pump is used to avoid further contamination of the gas mixture with oil. Also by placing the steam jet pump after scrubber 40, the amount of gas to be pumped is minimized and consequently the amount of water added to the gas mixture in the form of steam is minimized. However, the gaseous mixture leaving the steam jet pump 43 through conduit 43' at about 40° C. and 30 mm.–50 mm. Hg has oily contaminants in substantially reduced concentration and greatly increased water vapor concentration, i.e., it may have approximately 0.1% oily contaminants and 95% water vapor. Thereafter, the gaseous mixture is sent through condenser 45 where a large portion of the water vapor is condensed and removed along with other condensable components of the gaseous mixture through conduit 45'. The gaseous mixture leaving condenser 45 through conduit 46 may contain about 5% oily contaminants and 15% water vapor.

The gaseous mixture is then sent through a scrubber-condenser 47 where it is cooled to about 35° F. by a coolant such as ammonia and scrubbed with water. Because of the relatively high concentration of oily contaminants in the scrubber-condenser 47 and the absorbing effect of the scrub water, the water leaving scrubber-condenser 47 through conduit 47' may contain about 5% oily contaminants. Such result can be understood since the operating pressure of the scrubber condenser is usually about 30 to 50 mm. Hg so the partial pressure of the oily contaminants is at least about 1.5 mm. Hg and hence their dew point can be attained. The gaseous mixture may then be sent by conduit 48 from scrubber-condenser 47 to scrubber 49 for a final scrub with chilled water at about 35° F. entering at 50, and leaving through conduit 48 for reuse in scrubber-condenser 47. The gaseous mixture leaving scrubber 49 through conduit 51 to feed fractionating column 6 contains virtually no oily contaminants but still contains the major portion of the flavor and odor constituents since they are present in such small concentrations throughout the steps for removing the oily contaminants.

The scrub water from scrubber-condenser 47 is combined with the condensate from condenser 45 and the scrub water from scrubber 40 in conduit 61 and sent through cooler 60 to reduce resulting combined liquid temperature to about 35° F. The combined liquid stream leaving cooler 60 may contain about 0.5% oily contaminants so the lower temperature is preferred to facilitate separation. The liquid leaving cooler 60 through conduit 60' is combined with condensate from evaporator 1' and condenser 2 and sent to a centrifuge 62 where about 99.9% of the oily contaminants are removed through conduit 63. The aqueous solution leaving centrifuge 62 through conduit 64 is pumped by pump 65 through conduit 66 to a filter 67, where the last traces of oily contaminants are removed. Pumps should not be oil-lubricated since this would add additional oily contaminants. Filter 67 may be a conventional filter with a filter aid such as diatomaceous earth so long as the effective filter openings are sufficiently smaller than the oil globules in the aqueous solution, e.g., filter openings of approximately 1 micron compared to oil globules of approximately 10–100 microns. The described filtration step can be dispensed with in many cases. The aqueous solution leaving filter 67 by conduit 68 is then heated by heater 69 and sent to fractionating column 6 through conduit 70.

The following data may be of interest in indicating the results obtained on orange juice where the fractionating tower 6 was fed with vapors and condensate containing approximately 30 p.p.m. of the odor and flavor constituents and the entire system was maintained at a subatmospheric pressure of 45 mm. Hg. The condensate from the condenser 12 (maintained at a temperature of 38° C.) contained about 100 p.p.m. of the essence and amounted to two gallons per minute; the condensate from condenser 18 (maintained at a temperature of 16° C.) contained 20,000 p.p.m. of the essence but the discharge amounted to only 0.1 g.p.m.; the condensate from condenser 20 (maintained at a temperature of 10° C.) contained 100,000 p.p.m. of essence discharged at the rate of 0.1 g.p.m.; the scrubber 26, maintained at a temperature of only 2° C., accounted for 0.5 g.p.m. containing about 10,000 p.p.m. of essence. Different concentrations will be obtained from fruit of different variety and degree of maturity.

The diagrammatic flow chart, FIG. 4, includes in its upper left hand corner, a representation of a multiple effect evaporator composed of evaporator bodies A to F, inclusive, operated in series. As indicated, the juice on which the unit operates is fed into the evaporator body A of the system and flows successively to B, C, D, etc. Preferably the temperature condition in the evaporation zones is not above 65° C. and the pressure not above 190 mm. Hg. In actual operation, units A and F constitute one evaporator, units D and E constitute a second evaporator and units C and B constitute a third evaporator. As previously stated, however, any evaporating system operating at a lower pressure and temperature in an effective and efficient manner may be employed. Series operation of the evaporators increase the yield. It will be noted that the vapors flashed in body A go directly to the vapor condenser 12'. This condenser is also supplied with vapors from the shell of the unit and from unit C. The condenser 12' may condense a major portion of the water and oily contaminants from the gaseous mixture at a temperature below about 43° C. and preferably between 20° C. and 10° C. and a pressure below about 120 mm. Hg. Concentrated juice is discharged from the final unit F as by line 100.

Vapors from the vapor condenser 12' now go to a preparation unit located in the upper right hand corner of FIG. 4. These vapors pass by line 75 into a first scrubber 76. Residual vapors may then be combined with vapors from evaporating body C and pass into a jet condenser 77. Uncondensed gas may then be sent to another jet condenser 78 and then through a subcollector 79 and then be subjected to a second scrubbing in tower 80. The vapors are preferably scrubbed at temperatures between about 2° C. and 14° C.

All of the condensates and scrub waters which have absorbed the oily contaminates then pass into a collector 81. The condensate from the vapor condenser 12' is pumped therefrom as by line 82 through a brightening filter 83 and into a collection tank 84 which is fed from tank 81. The aqueous liquid in tank 84 contains not only the oily contaminates but also the flavor and odor constituents. From tank 84, this aqueous liquid may flow through a suitable flow meter through centrifuge 85 for discharging virtually all of the oil whereas the aqueous de-oiled liquid is discharged into tank 86.

This aqueous liquid may then be discharged as by pump 87 through a heat exchanger 88 into a stripping and rectifying column 6". This column may also be supplied as by line 89 with uncondensed gases from the second scrubber 80. The top of the column or tower 6" is preferably maintained (when working on citrus juices) at a temperature of about 38° C.–40° C. and a pressure of 50–55 mm. Hg. The vapors from this water stripping and rectifying zone pass as by line 90 into an overhead condenser 91 which knocks down most of the water and some of the flavor and odor constituents; this aqueous solution being sent to a collector 92. The remaining uncondensed constituents are sent through a series of interconnected fractional condensation zones 93a, 93b and 93c which are operated at progressively lower temperatures and a pressure below 120 mm. Hg and preferably between about 55 mm. and 30 mm. Hg. Usually it is desirable to maintain temperatures of not over 20° C. and preferably not over 12° C. in the first of the series and not much above 0° C. in the last of the series. The uncondensed vapors from saturation condenser 93C pass into a scrubber 94 where the last traces of desirable constituents are absorbed and discharged into a common manifold 95 which conveys all of the condensates from the condenser and scrubber to the collection tank 92.

The entire extraction system, from column 6" to scrubber 94, is maintained at a substantially uniform, subatmospheric pressure as, for example, by the heat of a constant pressure pot 30' (illustrated in greater detail in FIG. 2). This device is connected as by line V with the section line V illustrated in the upper right hand corner of FIG. 4, leading to the jets and barometric condensers there illustrated.

The condensate collected in tank 92 contains a high proportion of flavor and odor constituents. Although it may be sent directly through a suitable flow meter and cooler to a surge tank 101 and then into dispensing tanks 102, 103, etc., it has been found desirable to reflux a substantial portion of these collected condensates back to the stripping and rectifying column 6". This reflux line is indicated at 96. Moreover, in the event the condensate in 92 contains oily contaminants, it may be desirable to return an appreciable portion of these collected condensates to tank 84 as by dash line 96'. By diluting this concentrated condensate with either the condensate from vapor condenser 12' or the scrub waters and condensates collected in tank 81, the oily contaminants will be more effectively removed at 85 and oils will not build up in the system.

It is to be understood that the gases from the second scrubber 80 of the preparation plant can either be discharged into the atmosphere (first going through the jet and barometric condensers indicated) or they may be sent by line 89 to the column 6" or they may be sent by the alternate line 89' directly into the sequential series of fractional condensers 93. These alternative modifications can be used in accordance with the content of flavor and odor constituents contained in the gases being discharged from the preparation plant.

Similarly, the proportion of the concentrate from collection tank 92, which is recycled or refluxed, will depend upon the content or concentration of desirable components in such concentrate. Until a desired concentration is built up in the condensate collected in tank 92, substantially all may be refluxed by line 96 into the column; after a desired concentration of essence has been reached in such collected condensates then only 60%–90% of such condensates need be recirculated either at the column or to tank 84 or to both in a desired ratio.

Tanks 101, 102 and 103 are preferably purged with nitrogen or other inert gas before any of the essence is run thereinto and a small amount of such gas is constantly bled in in order to maintain an inert atmosphere above the essence concentrate. The stability of the essence is improved by this procedure. Attention is also called to the fact that the inlet line of the initial surge tank 101 extends to near the bottom of the tank and the rate at which such essence is withdrawn by pump 104 should not be sufficient to uncover the inlet into the tank.

In the event the essence is to be added to the concentrated juice discharged by the evaporation system through line 100, a variable output pump 105 may be connected to the discharge of any one of the storage tanks 102 or 103, the outlet of the pump 105 leading by line 106 to line 100 feeding concentrated juice to pump 107. Pumps 105 and 107 may be mechanically or electrically coupled so that a desired amount of essence is pumped into the flowing stream of concentrated juice whenever pump 107 is in operation to be intimately mixed with the concentrated juice in desired proportion. Other metering pump arrangements could be employed.

As previously indicated, the temperature and pressure conditions within the entire system and throughout the process are such as to prevent or minimize hydrolysis of the esters and ethers of acetic acid into acids, alcohols and secondary reaction products. A determination of the ethyl acetate content of the concentrate or condensates is the simplest and most effective method of determining the actual presence of the odor and flavor constituents and in evaluating such concentrates and essence. For purposes of the record, the following reagents and methods are employed in making the ether acetate determinations:

*Reagents employed (percent designations are weight/volume)*

(1) Hydroxylamine hydrochloride, 13.9% (2 M).
(2) NaOH, 3.5 N.
(3) HCl, 4 N.
(4) $FeCl_3.6H_2O$, 10% in 0.1 N HCl.
(5) Ethyl acetate standards; 25, 50, 100, 150, and 300 p.p.m. in distilled water. Weight 1.000 g. of pure ethyl acetate in a sealed container, transfer to 1 liter volumetric flask and dilute with water. Dilute this 1000 p.p.m. solution to prepare standards. Due to the high volatility of ethyl acetate, the transfers and dilutions must be done with a minimum exposure to evaporation.

*Determination*

Transfer 200 ml. of juice to an 800 ml. Kjeldahl flask, add 5 drops of mineral oil, a few glass beads and distill 50 ml. of water in a 125 ml. Erlenmeyer flask. The distillate is delivered below the surface of the receiving water by means of a glass tube constricted to a 2–3 mm. orifice. The receiving water is kept chilled by means of an ice water bath to minimize escape of the esters. Dilute the distillate to 100 ml.

Pipette 2 ml. of hydroxylamine reagent into a 50 ml. Erlenmeyer flask and add 5.0 ml. of the ester sample (standard solutions or distillates) followed immediately with 2 ml. of the sodium hydroxide reagent.

The hydroxylamine may be added to all flasks of a given assay at one time but the sodium hydroxide must be added as soon as possible after each ester sample. Mix and allow to stand for five minutes and then add 2 ml. of the hydrochloric acid reagent and mix. The individual flasks may be held at this point until all samples and standards of a given assay are also at this stage. Add 2 ml. of the ferric chloride reagent, mix, pour 5 ml. into a Klett tube, and read immediately, using filter 54 in a Klett photoelectric colorimeter which has been set at zero using a blank of 5 ml. of water plus 2 ml. of each of the four reagents.

Rinse Klett tube with a few ml. of colored sample before filling with the next sample. Use the same tube for all color readings. If matched tubes are available, the color may be developed directly in the tube using one-half as much of sample and reagents. Mix with a flat-tipped glass rod.

Calculate esters as ethyl acetate by comparison with the standards.

The above reagents and method of determination are particularly well adapted for the determination of the odor and flavor constituents in relatively dilute or low concentrations. The content of ethyl acetate in the essence or concentrates is normally obtained by diluting the concentrates to a desirable point, say, within a range of colorimetric determination against samples having a standard of 500, 1000 or 5000 p.p.m.

The essence obtained from the juice of citrus fruits, crushed berries and grapes, purees of deciduous fruits (such as apricots, apples, pears, peaches, etc.) can be used to impart a natural, fresh and characteristic flavor and aroma to food products and confections, ice cream, etc. or reincorporated into the concentrated source material. Orange essence obtained by this process can be added to concentrated orange juice and convert the usual flat, cooked taste of reconstituted beverages made from such concentrates into beverages which cannot be distinguished from natural fruit juice. Completely de-oiled citrus essences obtained by the methods herein disclosed are free from the terpene-like odors and flavors which characterize citrus oils. One of the important characteristics of the essences recovered by this process is stability upon storage; this may be due, in part at least, to the fact that hydrolysis and decomposition are minimized at the low temperature and pressure conditions, and to the fact that all of the constituents (including naturally contained stabilizing agents) are present in their usual, natural proportions.

Emphasis is again placed upon the necessity of maintaining low, uniform subatmospheric pressures throughout the system composed of the fractionating tower and condensers and the conjoint use of progressively lower temperatures at such uniform subatmospheric pressure in order to obtain an essence containing the exceptionally high content of odor- and flavor-imparting constituents in a form unaltered from that assumed by the constituents in the fresh, natural source material. For best results the maximum temperature of vapors should be below about 55° C. at a pressure of not above 115 mm. Hg absolute. Piping between condensers, scrubbers and fractionating tower should be sufficiently large to avoid any material variation in pressure in the system. All tanks should be gas tight.

The essence of coffe, tea, cacao beans, and other condiments and food products can be obtained by leaching the ground source materials with water at a temperature below about 30° C.–35° C. and then supplying such aqueous infusions to the fractionating tower and its associated system of condensers under the conditions hereinbefore described. Even in the case of coffee, the resulting essence is a colorless, water-miscible, mobile and volatile liquid of extremely low freezing point; a room is filled with the aromatic and stimulating fragrance of freshly percolating coffee when the stopper is removed from a small bottle of such essence. Alkaloids are absent and such coffee essence may be used in making flavorful coffee by addition to any inocuous, suitably colored aqueous solution.

I claim:

1. In a method of treating a gaseous mixture containing water vapor, flavor and odor constituents and a small proportion of oily contaminants, to obtain an essence containing a high concentration of flavor and odor constituents, the steps of:

subjecting the mixture to preliminary condensation to condense a major portion of the water and oily contaminants;

subjecting the remaining uncondensed gaseous mixture to repeated sequential scrubbing with cold water to condense a portion of the flavor and odor constituents and oily contaminants;

combining and collecting the aqueous condensates containing condensed flavor and odor constituents and oily contaminants;

removing substantially all of the oily contaminants from said aqueous condensates;

feeding the de-oiled aqueous condensate to a water stripping and rectifying zone wherein the vapors are subjected to a temperature not in excess of 55° C. and at a pressure of below 155 mm. Hg, to separate water from gaseous constituents;

subjecting the gaseous constituents discharged from said zone to a series of interconnected, fractional condensation zones all at a substantially uniform subatmospheric pressure of below 120 mm. Hg and at progressively lower temperatures in the range 18° C. to 0° C.;

combining the flavor and odor bearing condensates from said series of fractional condensation zones; and returning a selected portion of said combined flavor and odor bearing condensates as reflux to said stripping and rectifying zone to obtain a desired concentrate of flavor and odor constituents in the essence condensate.

2. A method as stated in claim 1 wherein the gaseous mixture treated is obtained by a multiple effect evaporation of citrus juice under temperature and pressure conditions not exceeding 65° C. and 190 mm. Hg, and said series of interconnected fractional condensation zones is maintained at a substantially uniform subatmospheric pressure in the range between about 55 mm. and 30 mm. of Hg and at progressively lower temperatures between 12° C. and 0° C.

3. A method as stated in claim 1 wherein between about 70% and 90% of said combined condensates from the fractional condensation zones are returned as reflux to the stripping and rectifying zone.

4. A method as stated in claim 1 wherein all uncondensed gases remaining after said repeated sequential scrubbing with cold water are sent through said series of interconnected fractional condensation zones.

5. A method as stated in claim 1 wherein a portion of the combined flavor and odor bearing condensates from the series of fractional condensation zones is combined with the aqueous condensates collected from the sequential scrubbing with cold water.

6. A method of obtaining flavor and odor constituents in concentrated form from fresh fruit juices comprising:

obtaining a fresh fruit juice concentrate by multiple effect evaporation of juice at a temperature of not over 65° C. and a pressure of not over 190 mm. Hg;

subjecting vapors from said evaporation, the vapors containing water, flavor and odor constituents and oily contaminants, to a temperature to below about 43° C. and a pressure of below about 120 mm. Hg to condense a major portion of the water from said vapors;

subjecting the remaining non-condensed gases to scrubbing with cold water and condensation to obtain an aqueous liquid containing flavor and odor constituents;

removing virtually all of the oily contaminants from said aqueous liquid;

subjecting said aqueous liquid to a temperature below 43° C. and a pressure of not over 55 mm. Hg in a rectifying and stripping zone under selected reflux conditions to remove water and obtain gases high in flavor and odor constituents; and subjecting the last named gases to a sequential series of condensing steps at a substantially uniform subatmospheric pressure and at progressively lower temperatures to obtain a condensate high in flavor and odor constituents.

7. A method as stated in claim 6 wherein virtually all of the contained oily contaminants are removed from the major portion of the water condensed from the vapors from said initial evaporation and such de-oiled water is treated in said rectifying and stripping zone.

8. A method as stated in claim 6 wherein from about 70% to about 90% of the condensate obtained from the last named sequential series of condensing steps is returned as reflux to the rectifying and stripping zone.

9. A method as stated in claim 7 wherein from about 70% to about 90% of the condensate obtained from the last named sequential series of condensing steps is returned as reflux to the rectifying and stripping zone.

10. A method as stated in claim 6 wherein the vapors from said evaporation are subjected to a temperature of between 20° C. and 10° C. during said initial condensation and the uncondensed gases are scrubbed and condensed at temperatures at between about 2° C. and 14° C.

11. A method as stated in claim 6 wherein the sequential series of condensing steps is conducted as a substantially uniform pressure not exceeding 55 mm. Hg and progressively lower temperatures within the range of 18° C. to 0° C.

12. A method as stated in claim 11 wherein from about 70% to about 90% of the condensate obtained from the last named sequential series of condensing steps is returned as reflux to the rectifying and stripping zone.

13. A method as stated in claim 6 wherein the vapors from said initial evaporation are subjected to a temperature of between 20° C. and 10° C. during said initial condensation and the non-condensed gases are scrubbed and condensed at temperatures between about 2° C. and 14° C.;

virtually all of the contained oily contaminants are removed from the major portion of the water condensed from the vapors from said initial evaporation and such de-oiled water is treated in said rectifying and stripping zone; and the sequential series of condensing steps is conducted at a substantially uniform pressure not exceeding 55 mm. Hg and progressively lower temperatures within the range 18° C.–0° C.

14. A method as stated in claim 13 wherein from about 70% to about 90% of the condensate obtained from the last named sequential series of condensing steps is returned as reflux to the rectifying and stripping zone.

15. A method as stated in claim 6 wherein the condensate high in flavor and odor constituents is collected under a blanket of inert gas and pumped into a flowing stream of the fresh fruit concentrate.

16. A method as stated in claim 13 wherein the condensate high in flavor and odor constituents is collected under a blanket of inert gas and pumped into a flowing stream of the fresh fruit concentrate.

17. A method as stated in claim 6 wherein a portion of the condensate high in flavor and odor constituents is combined with the aqueous liquid before the latter is deoiled.

18. A method as stated in claim 6 wherein a portion of the condensate high in flavor and odor constituents is combined with the condensate of the vapors from the initial multiple effect evaporation; oily contaminants are virtually removed from said combined condensates, and said combined, virtually deoiled condensates are treated in said rectifying and stripping zone.

References Cited by the Examiner

UNITED STATES PATENTS

| | | | |
|---|---|---|---|
| 2,457,315 | 12/1948 | Milleville | 99—205 |
| 2,513,813 | 7/1950 | Milleville | 99—205 |
| 2,625,525 | 1/1953 | Cross | 99—205 X |
| 2,641,550 | 6/1953 | Dykstra | 99—205 |
| 2,729,564 | 1/1956 | Keller | 99—205 X |

OTHER REFERENCES

Morgan et al.: Food Technology, 1953, vol. 7, No. 8, pp. 332–336.

A. LOUIS MONACELL, *Primary Examiner.*